United States Patent
Patel et al.

(10) Patent No.: US 11,884,288 B2
(45) Date of Patent: Jan. 30, 2024

(54) DYNAMIC VEHICLE WEIGHT CLASSIFICATION FOR ROUTE OPTIMIZATION

(71) Applicant: GM Global Technology Operations LLC, Detroit, MI (US)

(72) Inventors: Dhruv Patel, Oshawa (CA); Joseph F. Szczerba, Grand Blanc, MI (US); Abbas Mohammed, Whitby (CA); Kevin William Rypstra, Courtice (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 91 days.

(21) Appl. No.: 17/739,711

(22) Filed: May 9, 2022

(65) Prior Publication Data
US 2023/0356738 A1 Nov. 9, 2023

(51) Int. Cl.
| | |
|---|---|
| *B60W 50/14* | (2020.01) |
| *B60W 40/06* | (2012.01) |
| *B60W 40/13* | (2012.01) |
| *G01G 19/08* | (2006.01) |
| *G01C 21/34* | (2006.01) |
| *G07C 5/00* | (2006.01) |
| *G07C 5/08* | (2006.01) |

(52) U.S. Cl.
CPC ............ *B60W 50/14* (2013.01); *B60W 40/06* (2013.01); *B60W 40/13* (2013.01); *G01C 21/3469* (2013.01); *G01G 19/08* (2013.01); *G07C 5/008* (2013.01); *G07C 5/0808* (2013.01); *B60W 2050/146* (2013.01); *B60W 2556/60* (2020.02)

(58) Field of Classification Search
CPC .................................................... B60W 50/14
See application file for complete search history.

(56) References Cited

U.S. PATENT DOCUMENTS

| | | | |
|---|---|---|---|
| 10,821,851 B2 * | 11/2020 | Koebler | B60W 30/143 |
| 2012/0173075 A1 * | 7/2012 | Mays | B60W 10/06 |
| | | | 701/34.2 |
| 2018/0245966 A1 | 8/2018 | Mittal et al. | |
| 2018/0348012 A1 | 12/2018 | An et al. | |

(Continued)

FOREIGN PATENT DOCUMENTS

WO 2020070051 A1 4/2020

*Primary Examiner* — Joseph H Feild
*Assistant Examiner* — Pameshanand Mahase
(74) *Attorney, Agent, or Firm* — Vivacqua Crane, PLLC

(57) ABSTRACT

A method for classifying a weight of a vehicle includes determining a system enablement state of the vehicle load detection and classification system, monitoring a vehicle weight, determining a change in the vehicle weight, comparing the change in the vehicle weight to a first predefined weight change threshold, and categorizing the change in the vehicle weight in response to determining that the change in the vehicle weight exceeds the first predefined weight change threshold. The method also includes determining if a weight has been left in the vehicle after key-off and determining if a weight has been placed in a cargo compartment of the vehicle which exceeds the weight rating of the cargo compartment. The method also includes optimizing a route to a destination based at least on the change in the vehicle weight and displaying the optimized route to the destination using a human machine interface of the vehicle.

20 Claims, 3 Drawing Sheets

(56) References Cited

U.S. PATENT DOCUMENTS

2018/0364061 A1\* 12/2018 Chen ................. G01C 21/3605
2019/0086219 A1\* 3/2019 Hashisho ............. G05D 1/0223
2019/0113354 A1\* 4/2019 Matsumura ............ G01C 21/20

\* cited by examiner

DYNAMIC VEHICLE WEIGHT CLASSIFICATION FOR ROUTE OPTIMIZATION

INTRODUCTION

The present disclosure relates to energy conservation in vehicles, and more particularly, to a system and method for dynamically classifying changes in vehicle weight and providing a user with feedback to improve energy efficiency of the vehicle.

Systems and methods have been developed to improve the fuel efficiency of vehicles in order to increase the range of the vehicle before refueling is required, reduce emissions, and save the user money on fuel costs. Examples of these systems and methods include variable valve timing (VVT), gasoline direct injection (GDI), and cylinder deactivation. With the advent of electric vehicles, systems and methods for energy conservation are needed in order to increase vehicle range. Many factors may affect the efficiency of an electric vehicle. Those factors which affect the efficiency of an electric vehicle may be different from the factors which affect the efficiency of an internal combustion engine vehicle.

Thus, while current systems and methods to improve vehicle energy efficiency achieve their intended purpose, there is a need for a new and improved system and method for improving vehicle energy efficiency particularly for electric vehicles.

SUMMARY

According to several aspects, a method for classifying a weight of a vehicle is provided. The method includes monitoring a vehicle weight, determining a change in the vehicle weight, and comparing the change in the vehicle weight to a first predefined weight change threshold. The method also includes categorizing the change in the vehicle weight in response to determining that the change in the vehicle weight exceeds the first predefined weight change threshold, where the change in the vehicle weight is categorized as an occupant weight change or a cargo weight change. The method further includes determining a key-state of the vehicle, where the key-state includes a key-on state and a key-off state. The method also includes determining an elapsed key-off time that the vehicle has been in the key-off state in response to determining that the change in the vehicle weight exceeds the first predefined weight change threshold, and that vehicle is in a key-off state. The method also includes comparing the elapsed key-off time to a predefined elapsed key-off time threshold and performing a first action in response to determining that the elapsed key-off time has exceeded the predefined elapsed key-off time threshold and that the change in vehicle weight exceeds the first predefined weight change threshold. The method also includes determining a door position of a cargo compartment of the vehicle in response to determining that the change in the vehicle weight exceeds the first predefined weight change threshold, where the door position of the cargo compartment includes an open position and a closed position. The method also includes comparing the change in the vehicle weight to a second predefined weight change threshold in response to determining that the cargo compartment of the vehicle is in the open position and performing a second action in response to determining that the change in the vehicle weight exceeds the second predefined weight change threshold, and that the cargo compartment of the vehicle is in the open position. The method also includes optimizing a route to a destination based at least on the change in the vehicle weight and displaying the optimized route to the destination using a human machine interface (HMI) of the vehicle.

In another aspect of the present disclosure, monitoring a vehicle weight further includes determining an enablement state of a vehicle weight classification feature, where the enablement state includes a feature enabled state and a feature disabled state. Monitoring a vehicle weight further includes determining a plurality of door latch states for each of a plurality of doors in response to determining that the enablement state of the vehicle weight classification feature is in a feature enabled state, where the plurality of door latch states for each of the plurality of doors includes a closed door latch state and an open door latch state. Monitoring a vehicle weight further includes determining a rear heating ventilation and air conditioning (HVAC) state in response to determining that the enablement state of the vehicle weight classification feature is in a feature enabled state, where the rear HVAC state includes an HVAC enabled state and an HVAC disabled state. Monitoring a vehicle weight further includes determining a rear seat state in response to determining that the enablement state of the vehicle weight classification feature is in a feature enabled state, where the rear seat state includes a folded state and an unfolded state Monitoring a vehicle weight further includes monitoring the vehicle weight in response to determining that the enablement state of the vehicle weight classification feature is in a feature enabled state, and at least one of: determining that at least one of the plurality of door latch states is in the open door latch state, determining that the rear HVAC state is in the HVAC enabled state, and determining that the rear seat state is in the folded state.

In another aspect of the present disclosure, determining a change in a vehicle weight further includes determining the change in the vehicle weight based on at least one of: an input from a plurality of cargo weight sensors of the vehicle, an input from an air suspension system of the vehicle, and an input from a tire pressure detection system of the vehicle.

In another aspect of the present disclosure, determining a change in a vehicle weight further includes determining a location of the vehicle and retrieving a reference performance metric from a database of vehicle performance metrics based on the location of the vehicle. Determining a change in a vehicle weight further includes measuring a performance metric of the vehicle; comparing the measured performance metric to the reference performance metric to determine a performance metric deviation and determining the change in the vehicle weight based on the performance metric deviation.

In another aspect of the present disclosure, retrieving a reference performance metric further includes storing the database of vehicle performance metrics on a system external to the vehicle and accessing the database of vehicle performance metrics using a wireless communication system of the vehicle.

In another aspect of the present disclosure, measuring a performance metric of the vehicle further includes measuring at least one of: a vehicle battery performance metric, a vehicle thermal energy performance metric, and a vehicle drive motor system performance metric.

In another aspect of the present disclosure, measuring a performance metric of the vehicle further includes measuring an electrical current draw of an electric drive motor of the vehicle.

In another aspect of the present disclosure, categorizing the change in the vehicle weight further includes categorizing a change in the vehicle weight based on at least one of: the key-state of the vehicle, a location of the vehicle, an input from an occupant classification system (OCS) of the vehicle, an input from a door latch of the vehicle, a state of an HVAC control of the vehicle, and a software model configured to learn occupant weights over time. The change in the vehicle weight is categorized as an occupant weight change or a cargo weight change.

In another aspect of the present disclosure, performing a first action further includes notifying a user that the change in vehicle weight exceeds the first predefined weight change threshold using at least one of a mobile device and a human machine interface (HMI) system of the vehicle.

In another aspect of the present disclosure, performing a second action further includes notifying a user that the change in the vehicle weight exceeds the second predefined weight change threshold using at least one of a mobile device and a human machine interface (HMI) system of the vehicle.

In another aspect of the present disclosure, optimizing a route further includes optimizing a route to a destination based at least on the change in the vehicle weight and on at least one of: a motor losses chart, thermal energy performance metrics of the vehicle, total vehicle weight, road characteristics, and environmental conditions.

According to several aspects, a load detection and classification system for a vehicle is provided. The load detection and classification system also includes a vehicle weight sensor, where the vehicle weight sensor is at least one of: an air pressure sensor in a suspension system, a tire pressure sensing system, and a cargo weight sensor. The load detection and classification system also includes a plurality of vehicle sensors, including: a cargo compartment door latch sensor, a passenger door latch sensor, a key switch, a rear seat position sensor, and a plurality of seat weight sensors. The load detection and classification system also includes a human machine interface (HMI) and a controller in electrical communication with the vehicle weight sensor, the plurality of vehicle sensors, and the HMI. The controller is configured to determine a system enablement state of the load detection and classification system, where the system enablement state includes a system enabled state and a system disabled state. The controller is further configured to monitor a vehicle weight using the vehicle weight sensor in response to determining that the system enablement state is the system enabled state. The controller is further configured to determine a weight change of the vehicle based on the monitored vehicle weight and to compare the weight change to a first weight change threshold. The controller is further configured to categorize the weight change as an occupant weight change or a cargo weight change using the plurality of seat weight sensors in response to determining that the weight change is greater than the first weight change threshold. The controller is further configured to optimize a route to a destination based at least in part on the weight change in response to categorizing the weight change as a cargo weight change and display the optimized route to the destination using the HMI.

In another aspect of the present disclosure, the controller of the load detection and classification system is further configured to determine a key-state of the vehicle using the key switch in response to categorizing the weight change as a cargo weight change. The key-state includes a key-on state and a key-off state. The controller is further configured to measure an elapsed key-off time since the vehicle has entered the key-off state in response to determining that the key state is the key-off state. The controller is further configured to compare the elapsed key-off time to a key-off time threshold and notify a user using at least one of the HMI and a mobile device in response to determining that the elapsed key-off time is greater than the key-off time threshold.

In another aspect of the present disclosure, the controller of the load detection and classification system is further configured to determine a cargo door state of a cargo compartment of the vehicle using the cargo compartment door latch sensor in response to categorizing the weight change as a cargo weight change. The cargo door state includes an open state and a closed state. The controller is further configured to compare the weight change to a second weight change threshold in response to determining that the cargo door state is the open state and notify a user using at least one of the HMI and a mobile device in response to determining that the weight change is greater than the second weight change threshold.

In another aspect of the present disclosure, to determine a system enablement state of the vehicle load detection and classification system, the controller is further configured to determine a user enablement state based on an input from a user, where the user enablement state includes a user enabled state and a user disabled state. The controller is further configured to determine a passenger door latch state for at least one of a plurality of doors using the passenger door latch sensor in response to determining that the user enablement state is in the user enabled state. The passenger door latch state includes a closed passenger door latch state and an open passenger door latch state. The controller is further configured to determine a rear HVAC state in response to determining that user enablement state is in the user enabled state, where the rear HVAC state includes an HVAC enabled state and an HVAC disabled state. The controller is further configured to determine a rear seat state using the rear seat position sensor in response to determining that the user enablement state is in the user enabled state. The rear seat state includes a folded state and an unfolded state. The controller is further configured to output a system enabled state for the vehicle load detection and classification system in response to determining that the user enablement state is in the user enabled state, and at least one of: determining that the passenger door latch state is in the open passenger door latch state, determining that the rear HVAC state is in the HVAC enabled state, and determining that the rear seat state is in the folded state.

According to several aspects, a load detection and classification system for a vehicle is provided. The load detection and classification system includes a drive motor current sensor. The load detection and classification system also includes a plurality of vehicle sensors, including: a cargo compartment door latch sensor, a passenger door latch sensor, a key switch, a rear seat position sensor, and a seat weight sensor. The load detection and classification system also includes a global positioning system (GPS) and a human machine interface (HMI). The load detection and classification system also includes a controller in electrical communication with the drive motor current sensor, the plurality of vehicle sensors, the GPS, and the HMI, where the controller is configured to determine a system enablement state of the vehicle load detection and classification system. The system enablement state includes a system enabled state and a system disabled state. The controller is further configured to determine a weight change, compare the weight change to a first weight change threshold, and categorize the weight change as an occupant weight change or a cargo weight change in response to determining that the weight change is greater than the first weight change threshold. The controller is further configured to optimize a route to a destination based at least in part on the weight change in response to categorizing the weight change as a cargo weight change. The controller is further configured to display the optimized route to the destination using the HMI.

In another aspect of the present disclosure, to determine a system enablement state of the vehicle load detection and classification system, the controller is further configured to determine a user enablement state based on an input from a user, where the user enablement state includes a user enabled state and a user disabled state. The controller is further configured to determine a passenger door latch state for at least one of a plurality of doors using the passenger door latch sensor in response to determining that the user enablement state in the user enabled state. The passenger door latch state includes a closed passenger door latch state and an open passenger door latch state. The controller is further configured to determine a rear HVAC state in response to determining that user enablement state is in the user enabled state, where the rear HVAC state includes an HVAC enabled state and an HVAC disabled state. The controller is further configured to determine a rear seat state using the rear seat position sensor in response to determining that the user enablement state is in the user enabled state. The rear seat state includes a folded state and an unfolded state. The controller is further configured to output a system enabled state for the vehicle load detection and classification system in response to determining that the user enablement state is in the user enabled state, and at least one of: determining that the passenger door latch state is in the open passenger door latch state, determining that the rear HVAC state is in the HVAC enabled state, and determining that the rear seat state is in the folded state.

In another aspect of the present disclosure, to determine a weight change, the controller is further configured to record a set of location data using the GPS and a set of measured motor current draw data using the drive motor current sensor while the vehicle is in motion in response to determining that the system enablement state is the system enabled state. The controller is further configured to retrieve a set of reference motor current draw data from a database based on the set of location data and compare the set of reference motor current draw data to the set of measured motor current draw data to compute a motor current draw deviation. The controller is further configured to determine a weight change based on the motor current draw deviation.

In another aspect of the present disclosure, to retrieve a set of reference motor current draw data, the controller further is configured to determine at least one of: a vehicle road location and a vehicle road condition, where the vehicle road condition includes incline and surface conditions, based on the set of location data. The controller is further configured to establish a connection with a remote database containing a plurality of sets of reference motor current draw data, each of the plurality of sets of reference motor current draw data corresponding to at least one of: a reference road location and a reference road condition, where the reference road condition includes incline and surface conditions. The controller is further configured to retrieve a matching set of reference motor current draw data from the database, where at least one of: the reference road location corresponding to the matching set of reference motor current draw data is substantially similar to the vehicle road location and the reference road condition corresponding to the matching set of reference motor current draw data is substantially similar to the vehicle road condition.

In another aspect of the present disclosure, to categorize the weight change as an occupant weight change or a cargo weight change, the controller is further configured to classify between the occupant weight change and the cargo weight change using at least one of: the seat weight sensor, the passenger door latch sensor, the rear seat position sensor, and a rear HVAC control setting. The controller is further configured to learn occupant weights over time using a software model and at least one of: the seat weight sensor, the passenger door latch sensor, the rear seat position sensor, and a rear HVAC control setting.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
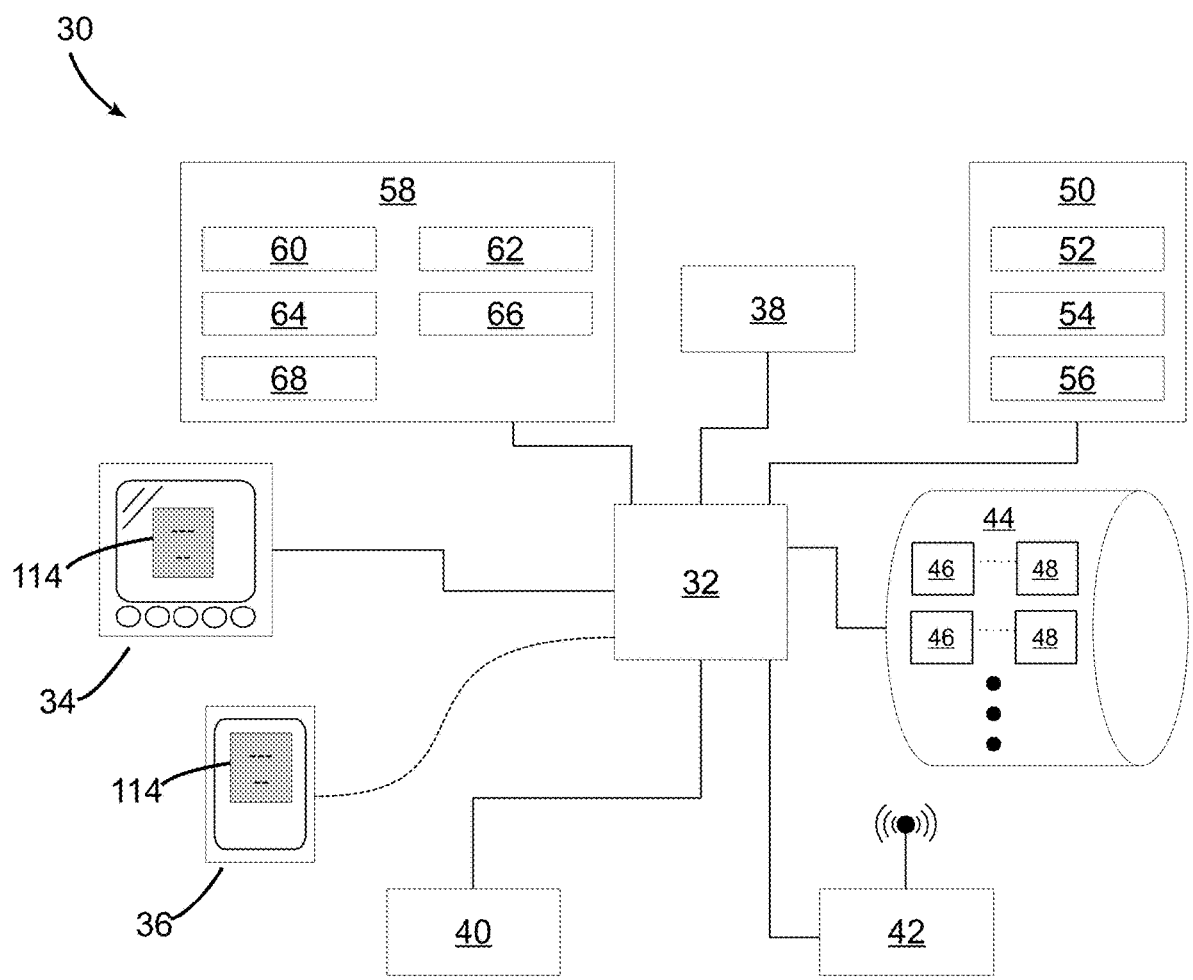
FIG. 1 is a block diagram for a load detection and classification system for a vehicle according to an exemplary embodiment.

Referring to FIG. 1, a block diagram for a load detection and classification system 30 for a vehicle is shown. The system 30 includes a controller 32, the controller 32 including at least a non-transitory form of memory for storing software instructions and a processing device capable of executing software instructions stored on the non-transient memory. The controller 32 also includes at least one electrical interface for data input, output, and communication with connected devices and systems. The electrical interface may also be capable of wireless communication, for example using WiFi, cellular data, or other wireless communication protocols.

The system 30 also includes a human-machine interface (HMI) 34 connected to the controller 32, and a mobile device 36 in communication with the controller 32. The HMI 34 and the mobile device 36 allow the system 30 to provide a user with feedback regarding the operation of the system 30. For example, the user may use the HMI to adjust settings of the system 30 such as a weight sensitivity of the system 30. The system 30 also includes a rear HVAC system 38 connected to the controller 32, allowing the controller 32 to determine the state of the HVAC controls in the rear passenger compartment of the vehicle. The system 30 also includes a drive motor current sensor 40 which allows the controller 32 to measure the electrical current flowing in the drive motor while the vehicle is in motion. The electrical current flowing in the drive motor of the vehicle may be related to the torque output of the drive motor of the vehicle.

The system 30 also includes a global positioning system (GPS) 42 which allows the controller 32 to determine a location of the vehicle.

The controller 32 is in communication with a database 44 of reference motor current draw data. The database 44 may be stored in the non-transitory memory of the controller 32 or in a non-transitory memory located elsewhere in the vehicle. The database 44 may also be located on a remote system and accessed using the wireless communication capability of the controller 32. For example, the database 44 may be stored on a server which is connected to the internet. The database 44 stores a plurality of sets of reference motor current draw data 46, each set of reference motor current draw data 46 corresponding to a set of reference road location data 48. Therefore, using location data from the GPS 42, the controller 32 can retrieve a set of reference motor current draw data 46 from the database 44 corresponding to the location of the vehicle.

The system 30 also includes at least one vehicle weight sensor 50 connected to the controller 32. The vehicle weight sensor 50 may be, for example, an air pressure sensor 52 of an air suspension system of the vehicle, a tire pressure sensing system 54 of the vehicle, or a cargo weight sensor 56 of the vehicle or a combination of the above. For example, the vehicle may be equipped with an air suspension system which allows the ride height of the vehicle to be adjusted. The air suspension system may contain an air pressure sensor 52, which can be used to determine the weight of the vehicle as a function of the air pressure in the suspension system. In another example, at least one cargo weight sensor 56 may be installed in the cargo compartment of a commercial or passenger vehicle. Using the cargo weight sensor 56, the controller 32 can determine the weight of the cargo in the vehicle.

The system 30 also includes a plurality of vehicle sensors 58 connected to the controller 32. The plurality of vehicle sensors 58 includes a cargo compartment door latch sensor 60, a passenger door latch sensor 62, a key switch 64, a rear seat position sensor 66, and a plurality of seat weight sensors 68. The door latch sensors 60 and 62 provide a signal to the controller 32 indicative of whether the doors are open or closed based on whether the door latches are engaged or not. The key switch 64 allows the controller 32 to determine whether the vehicle is in a key-on or key-off state. The rear seat position sensor 66 allows the controller 32 to determine if the rear seats are in a folded state or an unfolded state based on a signal from the rear seat position sensor 66. The plurality of seat weight sensors 68 allow the controller 32 to determine occupancy of the vehicle based on measurements of weight in the seats of the vehicle.

The elements of the system 30 including the HMI 34, the mobile device 36, the rear HVAC system 38, the drive motor current sensor 40, the GPS 42, the database 44, the vehicle weight sensor 50, and the plurality of vehicle sensors 58 are in electrical communication with the controller 32. The electrical communication may be established, for example, using a Controller Area Network (CAN) bus, a wireless communication system communicating within the vehicle, or a wireless communication system communicating external to the vehicle, for example an internet connection. One skilled in the art will appreciate that the components of the system 30 may be in communication with the controller 32 using various additional connections, protocols, and methods.

Figure 2A:
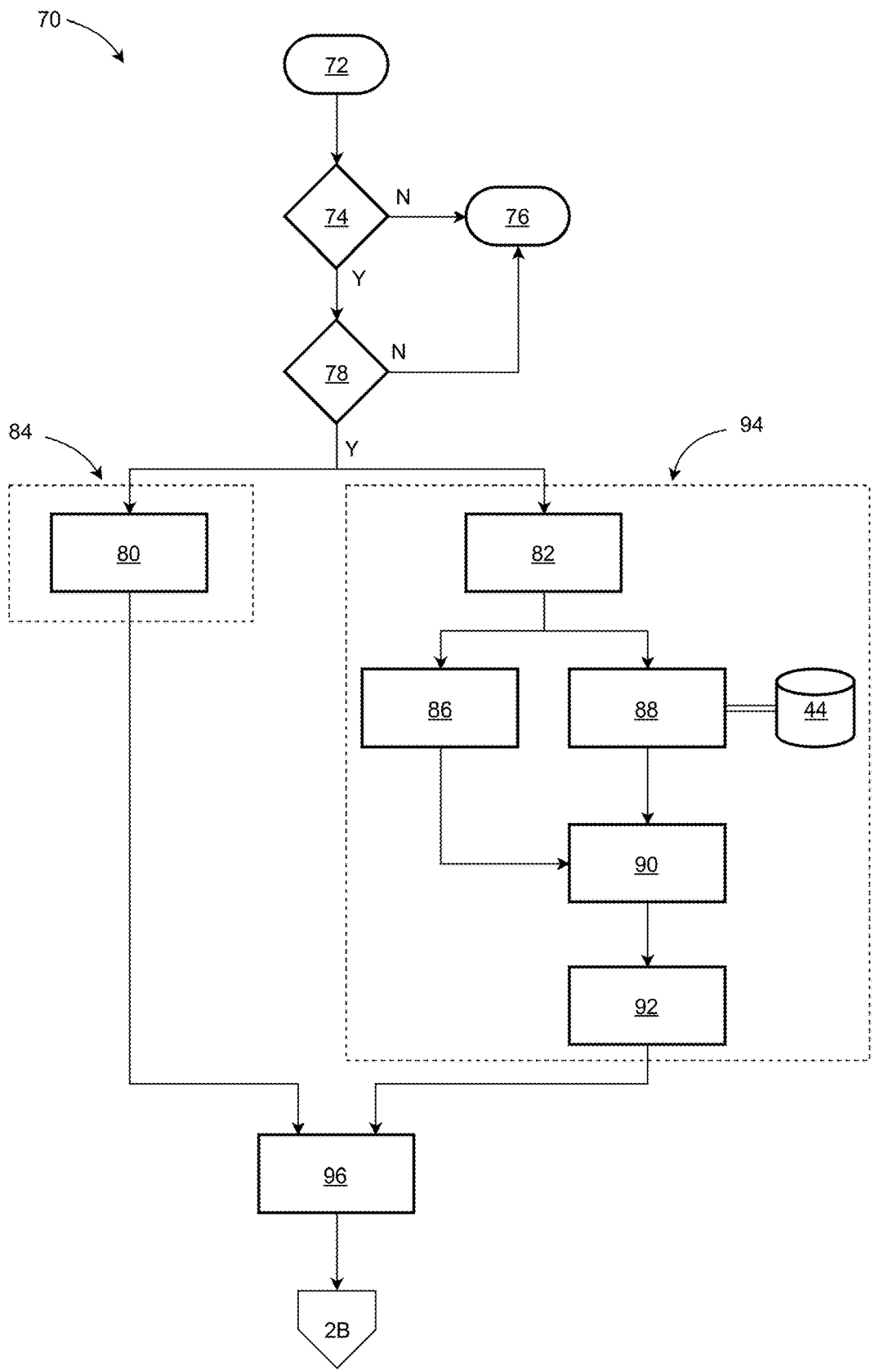
FIG. 2A is a flowchart of a method for classifying a weight of a vehicle according to an exemplary embodiment.
Figure 2B:
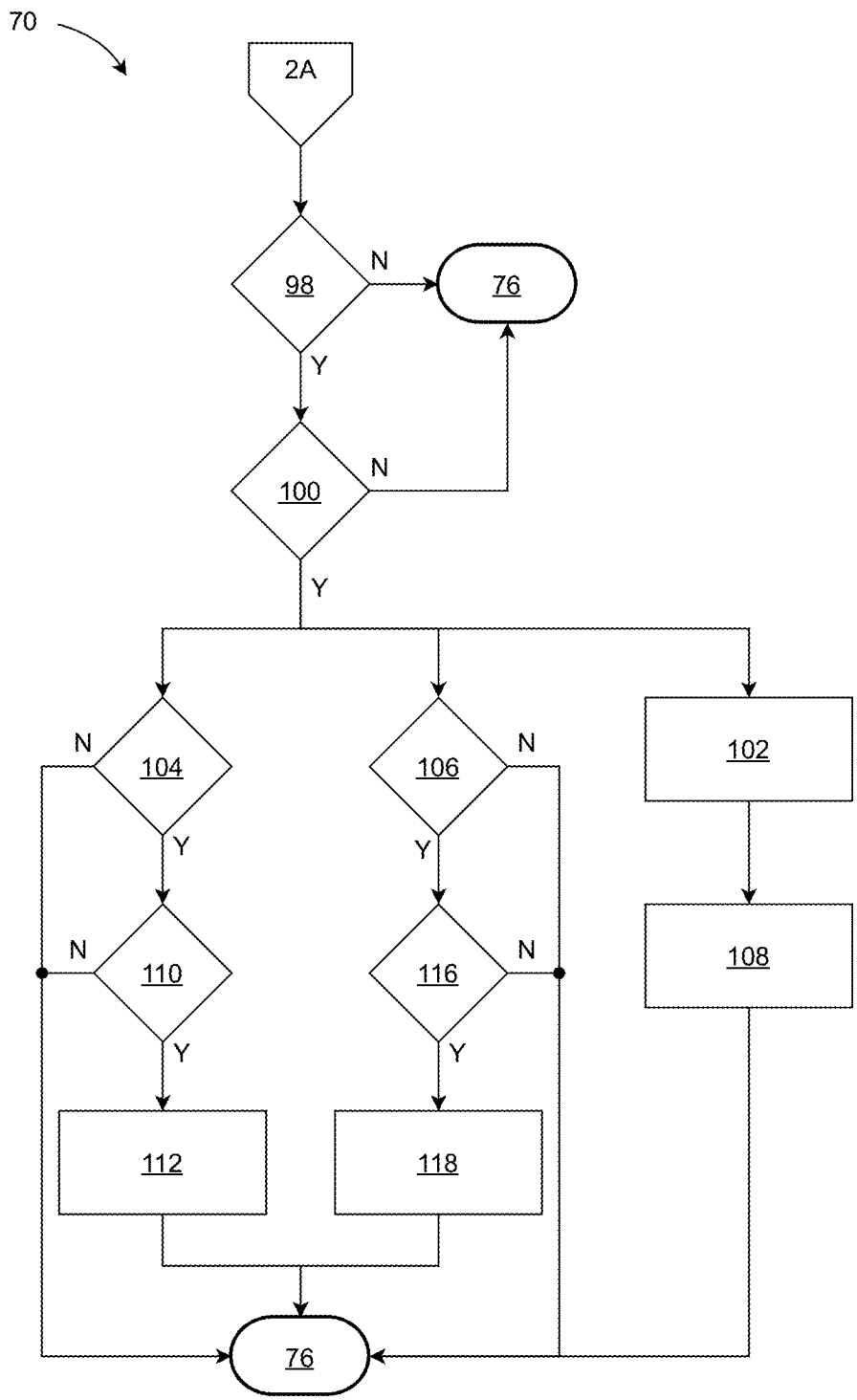
FIG. 2B is a continuation of the flowchart of FIG. 2A according to an exemplary embodiment.

The non-transitory memory of the controller 32 may contain software instructions which instruct the processing device of the controller 32 to perform a method 70 for classifying a weight of a vehicle as shown and described in reference to FIG. 2A and FIG. 2B. The non-transitory memory of the controller 32 may contain software instructions which execute the method on a time-based loop, for example every ten seconds. In an alternative embodiment, the non-transitory memory of the controller 32 may contain software instructions which execute the method 70 only under certain conditions, for example within ten seconds of a key-off or key-on event.

Referring to FIG. 2A and again to FIG. 1, a flowchart of the method 70 for classifying a weight of a vehicle is shown. The method 70 begins at block 72 and proceeds to block 74. At block 74, a determination is made as to whether the user has enabled the load detection and classification system 30. If the determination is made that the user has not enabled the system 30, then the method enters a standby state 76. If the determination is made that the user has enabled the system 30, the method proceeds to block 78. At block 78, a determination is made as to whether any of the following three conditions are satisfied:

(1) any passenger door latch sensor 62 or cargo compartment door latch sensor 60 is in an open door latch state; or (2) the rear HVAC system is inactive, as indicated by the rear HVAC system 38; or (3) the rear seats are folded, as indicated by the rear seat position sensor 66.

If none of the three conditions are satisfied, the method enters a standby state 76. If any of three conditions are satisfied, the method proceeds to blocks 80 and 82.

At block 80, a weight change of the vehicle is determined using at least one vehicle weight sensor 50 if the vehicle is equipped with a vehicle weight sensor 50 as discussed in reference to FIG. 1. Alternatively, if the vehicle is not equipped with a vehicle weight sensor 50, block 80 may be omitted from the method 70. The process of determining a weight change of the vehicle by the process of block 80 is referred to as segment one 84 of the method 70.

At block 82, the location of the vehicle is determined using the GPS 42. The method 70 then proceeds to blocks 86 and 88. At block 86, a performance metric of the vehicle is measured. The measured performance metric may include, for example, a vehicle battery performance metric, a vehicle thermal energy performance metric, and a vehicle drive motor system performance metric. The vehicle battery performance metric may be, for example, an amount of thermal energy emitted as heat by a drivetrain or power system of the vehicle. The battery performance metric may be, for example, a rate of charge or discharge of a battery of the vehicle. The vehicle drive motor system performance metric may be, for example, a drive motor current draw. The drive motor current draw is an amount of electrical current flowing through a drive motor of the vehicle. In an exemplary embodiment, the measured performance metric is the drive motor current draw which is measured by the drive motor current sensor 40 at block 86.

At block 88, a reference performance metric is retrieved from the database 44. Retrieving the reference performance metric from the database 44 may include establishing a wireless connection with the database 44 if the database 44 is located in a remote location outside of the vehicle. The reference performance metric is selected from the database 44 using the location of the vehicle determined at block 82 such that the reference performance metric corresponds with a specific road location or road condition where the vehicle is currently driving. For example, if a reference performance metric at the specific road location of the vehicle is unavailable, a reference performance metric at a road location with a similar road condition may be selected. The road condition may include the incline of the road and the surface conditions of the road, such as pavement type and quality. In an exemplary embodiment, the reference performance metric is reference motor current draw data 46 which corresponds to reference road location data 48 in the database 44. The method 70 then proceeds to block 90.

At block 90, the measured performance metric determined at block 86 is compared to the reference performance metric retrieved from the database 44 at block 88. The result of the comparison at block 90 is a deviation between the measured performance metric and the reference performance metric. In an exemplary embodiment, the result of the comparison at block 90 is a motor current draw deviation. The method 70 then proceeds to block 92. At block 92, a vehicle weight change is determined based on the deviation determined at block 90. The vehicle weight change may be determined at block 92 using a lookup table stored in the non-transitory memory of the controller 32 of the vehicle or on a remote system and accessed using the wireless communication system of the controller 32. The vehicle weight change may also be determined at block 92 using a predetermined mathematical relationship which relates the deviation to a change in the vehicle weight. For example, the vehicle weight change may be directly proportional to the motor current draw deviation. One skilled in the art will appreciate that additional mathematical relationships between the motor current draw deviation and the vehicle weight change may be used to determine the vehicle weight change based on the motor current draw deviation. The process of determining a weight change of the vehicle by the process of blocks 82, 86, 88, 90, and 92 is referred to as segment two 94 of the method 70.

Based on multiple factors, including the key state of the vehicle (whether the key switch 64 is in an on or off state), the speed of the vehicle, the availability of weight sensors 50 on the vehicle, and driver preferences, one or both of segments one 84 and two 94 may be performed in the method 70. At block 96, an estimated weight change is calculated based on the weight changes calculated by segment one 84 and segment two 94. The estimated weight change may be calculated at block 96 using an average of the results of segment one 84 and segment two 94 or a weighted average of the results of segment one 84 and segment two 94. The weights of the weighted average may be predetermined based on testing data, or dynamically determined based on factors such as the quality of the measurements performed by segment one 84 and segment two 94. One skilled in the art will appreciate that a variety of additional methods may be used to determine the estimated weight change at block 96. The method 70 then proceeds to block 98 as shown and described in reference to FIG. 2B.

Referring to FIG. 2B, a continuation of the flowchart of the method 70 from FIG. 2A is shown. At block 98, the estimated weight change is compared to a first weight change threshold. The first weight change threshold may be predetermined or set dynamically and may define, for example, a minimum weight change which affects the efficiency of the vehicle. If the estimated weight change is less than the first weight change threshold, the method 70 enters a standby state 76. If the estimated weight change is greater than or equal to the first weight change threshold, the method 70 proceeds to block 100.

At block 100, a determination is made as to whether the estimated weight change is a result of cargo being added to the vehicle or occupants entering the vehicle. To make the determination at block 100, the vehicle sensors 58 such as cargo compartment door latch sensors 60, passenger door latch sensors 62, rear seat position sensors 66 and seat weight sensors 68 are used. Other sensors and systems may also be used to categorize the weight change as a cargo weight change or an occupant weight change, including a camera vision system in the vehicle or an occupant classification system (OCS) of the vehicle. In an exemplary embodiment, the controller 32 is configured with a software model to learn occupant weights over time using the seat weight sensors 68 or the OCS of the vehicle. The controller 32 may use inputs from the seat weight sensors 68 or the OCS to determine weights of typical passengers in order to increase the accuracy of the determination made at block 100. If the estimated weight change is determined to be due to occupants in the vehicle, the method 70 enters a standby mode 76. If the estimated weight change is determined to be due to cargo in the vehicle, the method 70 proceeds to blocks 102, 104, and 106.

At block 102, a route to a destination is optimized based on the estimated weight change. To optimize the route based on the estimated weight change, the vehicle weight information is used as an input to a route optimization algorithm. The route optimization algorithm may take into account information such as road closures, environmental conditions such as weather conditions, traffic conditions, and other characteristics of multiple possible routes to determine an optimal route to the destination. By providing the route optimization algorithm with information about the estimated weight change in addition to information such as motor efficiency as a function of vehicle weight and thermal energy consumption as a function of vehicle weight, the route optimization algorithm may select a more energy efficient route based on the weight of the vehicle. Route factors which may be considered by the route optimization algorithm include road speed limits, grade changes, number of traffic signals and stop signs along the route, and current traffic conditions. The route optimization algorithm may also consider characteristics of the vehicle, such as a motor losses chart and thermal energy performance metrics of the vehicle. A motor losses chart may relate motor efficiency to vehicle weight. Thermal energy performance metrics of the vehicle may be, for example, a relationship between the efficiency of the drivetrain of the vehicle and a temperature of a component of the drivetrain such as an electric motor. In an exemplary embodiment, the route optimization algorithm may select a route which includes fewer steep inclines if the vehicle weight is determined to be greater than a vehicle weight threshold. One skilled in the art will appreciate that there are various additional route characteristics which may be optimized based on the estimated weight change of the vehicle in order to determine a more energy efficient route than would be calculated without the vehicle weight information. After an optimized route to the destination is determined, the method 70 proceeds to block #39 #.

At block 108, the optimized route is displayed on an HMI 34 of the vehicle so that the driver may take action based on the optimized route to conserve energy. For example, conserving energy may result in an electric vehicle having a longer effective range before the batteries of the vehicle must be recharged. The method 70 then proceeds to enter a standby state 76.

At block 104, a determination is made as to whether the key switch 64 of the vehicle is in the off position. If the key switch 64 is determined to be in the on position, the method 70 proceeds to enter a standby state 76. If the key switch 64 is determined to be in the off position, the method 70 proceeds to block 110.

At block 110, a determination is made as to how long the key switch 64 has been in the off position. If key switch 64 has been in the off position for a time that does not exceed a predefined key-off time threshold, the method 70 proceeds to enter a standby state 76. If key switch 64 has been in the off position for a time that does exceed the predefined key-off time threshold, the method 70 proceeds to block 112.

At block 112, a notification 114 is displayed on the HMI 34 and/or on the mobile device 36 informing the driver that cargo has been left in the vehicle after the vehicle has been shut off. This gives the driver the opportunity to remove the cargo before the next drive, thus improving the energy efficiency of the vehicle during the next drive. For example, a driver may have returned from a trip and left a heavy piece of luggage in the vehicle. Upon receiving the notification 114, the driver may remove the luggage and thus avoid reduced energy efficiency due to the extra weight of the luggage during a subsequent drive. After block 112, the method 70 proceeds to enter a standby state 76.

At block 106, a determination is made as to whether a cargo compartment of the vehicle is in an open state. The state of the cargo compartments of the vehicle may be evaluated using cargo compartment door latch sensors 60. If a cargo compartment of the vehicle is not in an open state, the method 70 proceeds to enter a standby state 76. If a cargo compartment of the vehicle is in an open state, the method 70 proceeds to block 116.

At block 116, the estimated weight change determined at block 96 is compared to a second weight change threshold. The second weight change threshold may be, for example, a maximum weight rating of a cargo compartment of the vehicle. If the estimated weight change is determined to be less than the second weight change threshold, the method 70 proceeds to enter a standby state 76. If the estimated weight change is determined to be greater than or equal to the second weight change threshold, the method 70 proceeds to block 118.

At block 118, a notification 114 is displayed on the HMI 34 and/or on a mobile device 36 informing the driver that cargo has been placed in a cargo compartment of the vehicle which exceeds the rated weight capacity of the cargo compartment. For example, after placing a heavy piece of construction equipment in a cargo compartment of the vehicle, the driver may be informed using the notification 114 that the rated weight capacity of the cargo compartment has been exceeded, and the driver may take action to avoid damage to the vehicle. After block 118, the method 70 proceeds to enter a standby state 76.

Aspects of the notification 114 which is displayed on the HMI 34 at blocks 112 and 118 may be customized based on preferences of the user. For example, the notification 114 may be configured by the user to be displayed only on the HMI 34 or only on the mobile device 36. In another example, the notification 114 may be disabled by the user. One skilled in the art will appreciate that various additional aspects of the notification 114 may be configured by the user using the HMI 34.

The load detection and classification system and method of the present disclosure offers several advantages. These include improving range estimation capabilities of electric vehicles by incorporating information about the vehicle weight, providing the driver with energy efficient routes based on detected changes in the weight of the vehicle, and encouraging more energy efficient behaviors by notifying the driver to remove heavy items left in the vehicle. Advantages of the present disclosure further include preventing damage to the vehicle or cargo compartments of the vehicle by notifying the driver if the weight capacity of the vehicle is surpassed. The load detection and classification system of the present disclosure may also be used to detect long-term accumulation of marginal additional weight. For example, as the user drives the vehicle over a long period of time, personal belongings of the user may begin to accumulate in the vehicle, resulting in reduced efficiency. By recording multiple vehicle weight change measurements in the non-transient memory of the controller 32 over the long period of time, the controller 32 may detect the long-term accumulation of marginal additional weight and notify the user.

The load detection and classification system and method of the present disclosure may be used in a delivery vehicle to detect a theft of a package by identifying that a weight is removed at an unexpected location. Detection of removal of a weight at an unexpected location may also be used to identify a package being delivered to an incorrect address, and subsequently notifying the driver of the delivery vehicle. Additionally, delivery vehicles may experience large weight changes as packages are delivered. A further advantage of the present disclosure is the capability to dynamically optimize the route of the delivery vehicle based on changing weight in order to conserve energy. Furthermore, remote monitoring using wireless communication with the controller 32 can allow a management team to remotely monitor characteristics of the delivery vehicle and encourage efficient driving behaviors. For example, upon determining that a delivery vehicle is accelerating at a high rate while carrying a significant weight, the management team may remotely limit or otherwise alter the performance of the delivery vehicle to encourage efficient driving behaviors.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for classifying a weight of a vehicle, the method comprising:
 monitoring a vehicle weight;
 determining a change in the vehicle weight;
 comparing the change in the vehicle weight to a first predefined weight change threshold;
 categorizing the change in the vehicle weight in response to determining that the change in the vehicle weight exceeds the first predefined weight change threshold, wherein the change in the vehicle weight is categorized as an occupant weight change or a cargo weight change;
 determining a key-state of the vehicle, wherein the key-state includes a key-on state and a key-off state;
 determining an elapsed key-off time that the vehicle has been in the key-off state in response to determining that the change in the vehicle weight exceeds the first predefined weight change threshold, and that vehicle is in a key-off state;
 comparing the elapsed key-off time to a predefined elapsed key-off time threshold;
 performing a first action in response to determining that the elapsed key-off time has exceeded the predefined elapsed key-off time threshold and that the change in vehicle weight exceeds the first predefined weight change threshold;

determining a door position of a cargo compartment of the vehicle in response to determining that the change in the vehicle weight exceeds the first predefined weight change threshold, wherein the door position of the cargo compartment includes an open position and a closed position;

comparing the change in the vehicle weight to a second predefined weight change threshold in response to determining that the cargo compartment of the vehicle is in the open position;

performing a second action in response to determining that the change in the vehicle weight exceeds the second predefined weight change threshold, and that the cargo compartment of the vehicle is in the open position;

optimizing a route to a destination based at least on the change in the vehicle weight; and displaying the optimized route to the destination using a Human Machine Interface (HMI) of the vehicle.

2. The method of claim 1, wherein monitoring a vehicle weight further comprises:

determining an enablement state of a vehicle weight classification feature, wherein the enablement state includes a feature enabled state and a feature disabled state;

determining a plurality of door latch states for each of a plurality of doors in response to determining that the enablement state of the vehicle weight classification feature is in a feature enabled state, wherein the plurality of door latch states for each of the plurality of doors includes a closed door latch state and an open door latch state;

determining a rear HVAC state in response to determining that the enablement state of the vehicle weight classification feature is in a feature enabled state, wherein the rear HVAC state includes an HVAC enabled state and an HVAC disabled state;

determining a rear seat state in response to determining that the enablement state of the vehicle weight classification feature is in a feature enabled state, wherein the rear seat state includes a folded state and an unfolded state; and monitoring the vehicle weight in response to determining that the enablement state of the vehicle weight classification feature is in a feature enabled state, and at least one of: determining that at least one of the plurality of door latch states is in the open door latch state, determining that the rear HVAC state is in the HVAC enabled state, and determining that the rear seat state is in the folded state.

3. The method of claim 1, wherein determining a change in a vehicle weight further comprises:

determining the change in the vehicle weight based on at least one of: an input from a plurality of cargo weight sensors of the vehicle, an input from an air suspension system of the vehicle, an input from a tire pressure detection system of the vehicle.

4. The method of claim 1, wherein determining a change in a vehicle weight further comprises:

determining a location of the vehicle;

retrieving a reference performance metric from a database of vehicle performance metrics based on the location of the vehicle;

measuring a performance metric of the vehicle;

comparing the measured performance metric to the reference performance metric to determine a performance metric deviation; and determining the change in the vehicle weight based on the performance metric deviation.

5. The method of claim 4, wherein retrieving a reference performance metric further comprises:

storing the database of vehicle performance metrics on a system external to the vehicle; and accessing the database of vehicle performance metrics using a wireless communication system of the vehicle.

6. The method of claim 4, wherein measuring a performance metric of the vehicle includes measuring at least one of: a vehicle battery performance metric, a vehicle thermal energy performance metric, and a vehicle drive motor system performance metric.

7. The method of claim 6, wherein measuring a performance metric of the vehicle includes measuring an electrical current draw of an electric drive motor of the vehicle.

8. The method of claim 1, wherein categorizing the change in the vehicle weight further comprises:

categorizing a change in the vehicle weight based on at least one of: the key-state of the vehicle, a location of the vehicle, an input from an occupant classification system (OCS) of the vehicle, an input from a door latch of the vehicle, a state of an HVAC control of the vehicle, and a software model configured to learn occupant weights over time, wherein the change in the vehicle weight is categorized as an occupant weight change or a cargo weight change.

9. The method of claim 1, wherein performing a first action further comprises, notifying a user that the change in vehicle weight exceeds the first predefined weight change threshold using at least one of a mobile device and a Human Machine Interface (HMI) system of the vehicle.

10. The method of claim 1, wherein performing a second action further comprises, notifying a user that the change in the vehicle weight exceeds the second predefined weight change threshold using at least one of a mobile device and a Human Machine Interface (HMI) system of the vehicle.

11. The method of claim 1, wherein optimizing a route further comprises, optimizing a route to a destination based at least on the change in the vehicle weight and on at least one of: a motor losses chart, thermal energy performance metrics of the vehicle, total vehicle weight, road characteristics, and environmental conditions.

12. A load detection and classification system for a vehicle comprising:

a vehicle weight sensor, wherein the vehicle weight sensor is at least one of: an air pressure sensor in a suspension system, a tire pressure sensing system, and a cargo weight sensor;

a plurality of vehicle sensors, including: a cargo compartment door latch sensor, a passenger door latch sensor, a key switch, a rear seat position sensor, and a plurality of seat weight sensors;

a Human Machine Interface (HMI);

a controller in electrical communication with the vehicle weight sensor, the plurality of vehicle sensors, and the HMI, wherein the controller is configured to:

determine a system enablement state of the load detection and classification system, wherein the system enablement state includes a system enabled state and a system disabled state;

monitor a vehicle weight using the vehicle weight sensor in response to determining that the system enablement state is the system enabled state;

determine a weight change of the vehicle based on the monitored vehicle weight;

compare the weight change to a first weight change threshold;

categorize the weight change as an occupant weight change or a cargo weight change using the plurality of seat weight sensors in response to determining that the weight change is greater than the first weight change threshold;

optimize a route to a destination based at least in part on the weight change in response to categorizing the weight change as a cargo weight change; and display the optimized route to the destination using the HMI.

13. The load detection and classification system of claim 12, wherein the controller is further configured to:

determine a key-state of the vehicle using the key switch in response to categorizing the weight change as a cargo weight change, wherein the key-state includes a key-on state and a key-off state;

measure an elapsed key-off time since the vehicle has entered the key-off state in response to determining that the key state is the key-off state;

compare the elapsed key-off time to a key-off time threshold; and notify a user using at least one of the HMI and a mobile device in response to determining that the elapsed key-off time is greater than the key-off time threshold.

14. The load detection and classification system of claim 12, wherein the controller is further configured to:

determine a cargo door state of a cargo compartment of the vehicle using the cargo compartment door latch sensor in response to categorizing the weight change as a cargo weight change, wherein the cargo door state includes an open state and a closed state;

compare the weight change to a second weight change threshold in response to determining that the cargo door state is the open state; and notify a user using at least one of the HMI and a mobile device in response to determining that the weight change is greater than the second weight change threshold.

15. The load detection and classification system of claim 12, wherein to determine a system enablement state of the load detection and classification system, the controller is further configured to:

determine a user enablement state based on an input from a user, wherein the user enablement state includes a user enabled state and a user disabled state;

determine a passenger door latch state for at least one of a plurality of doors using the passenger door latch sensor in response to determining that the user enablement state is in the user enabled state, wherein the passenger door latch state includes a closed passenger door latch state and an open passenger door latch state;

determine a rear HVAC state in response to determining that user enablement state is in the user enabled state, wherein the rear HVAC state includes an HVAC enabled state and an HVAC disabled state;

determine a rear seat state using the rear seat position sensor in response to determining that the user enablement state is in the user enabled state, wherein the rear seat state includes a folded state and an unfolded state; and output a system enabled state for the load detection and classification system in response to determining that the user enablement state is in the user enabled state, and at least one of: determining that the passenger door latch state is in the open passenger door latch state, determining that the rear HVAC state is in the HVAC enabled state, and determining that the rear seat state is in the folded state.

16. A load detection and classification system for a vehicle comprising:

a drive motor current sensor;

a plurality of vehicle sensors, including: a cargo compartment door latch sensor, a passenger door latch sensor, a key switch, a rear seat position sensor, and a seat weight sensor;

a Global Positioning System (GPS);

a Human Machine Interface (HMI);

a controller in electrical communication with the drive motor current sensor, the plurality of vehicle sensors, the GPS, and the HMI, wherein the controller is configured to:

determine a system enablement state of the load detection and classification system, wherein the system enablement state includes a system enabled state and a system disabled state;

determine a weight change;

compare the weight change to a first weight change threshold;

categorize the weight change as an occupant weight change or a cargo weight change in response to determining that the weight change is greater than the first weight change threshold;

optimize a route to a destination based at least in part on the weight change in response to categorizing the weight change as a cargo weight change; and display the optimized route to the destination using the HMI.

17. The load detection and classification system of claim 16, wherein to determine a system enablement state of the load detection and classification system, the controller is further configured to:

determine a user enablement state based on an input from a user, wherein the user enablement state includes a user enabled state and a user disabled state;

determine a passenger door latch state for at least one of a plurality of doors using the passenger door latch sensor in response to determining that the user enablement state is in the user enabled state, wherein the passenger door latch state includes a closed passenger door latch state and an open passenger door latch state;

determine a rear HVAC state in response to determining that user enablement state is in the user enabled state, wherein the rear HVAC state includes an HVAC enabled state and an HVAC disabled state;

determine a rear seat state using the rear seat position sensor in response to determining that the user enablement state is in the user enabled state, wherein the rear seat state includes a folded state and an unfolded state; and output a system enabled state for the load detection and classification system in response to determining that the user enablement state is in the user enabled state, and at least one of: determining that the passenger door latch state is in the open passenger door latch state, determining that the rear HVAC state is in the HVAC enabled state, and determining that the rear seat state is in the folded state.

18. The load detection and classification system of claim 16, wherein to determine a weight change, the controller is further configured to:

record a set of location data using the GPS and a set of measured motor current draw data using the drive motor current sensor while the vehicle is in motion in response to determining that the system enablement state is the system enabled state;

retrieve a set of reference motor current draw data from a database based on the set of location data;

compare the set of reference motor current draw data to the set of measured motor current draw data to compute a motor current draw deviation; and determine a weight change based on the motor current draw deviation.

19. The load detection and classification system of claim 18, wherein to retrieve a set of reference motor current draw data, the controller is configured to:

determine at least one of: a vehicle road location and a vehicle road condition, wherein the vehicle road condition includes incline and surface conditions, based on the set of location data;

establish a connection with a remote database containing a plurality of sets of reference motor current draw data, each of the plurality of sets of reference motor current draw data corresponding to at least one of: a reference road location and a reference road condition, wherein the reference road condition includes incline and surface conditions; and retrieve a matching set of reference motor current draw data from the database, wherein at least one of: the reference road location corresponding to the matching set of reference motor current draw data is substantially similar to the vehicle road location and the reference road condition corresponding to the matching set of reference motor current draw data is substantially similar to the vehicle road condition.

20. The load detection and classification system of claim 16, wherein to categorize the weight change as an occupant weight change or a cargo weight change, the controller is further configured to:

classify between the occupant weight change and the cargo weight change using at least one of: the seat weight sensor, the passenger door latch sensor, the rear seat position sensor, and a rear HVAC control setting; and learn occupant weights over time using a software model and at least one of: the seat weight sensor, the passenger door latch sensor, the rear seat position sensor, and a rear HVAC control setting.

* * * * *